US012573318B2

(12) United States Patent
Kelly

(10) Patent No.: US 12,573,318 B2
(45) Date of Patent: Mar. 10, 2026

(54) FOLDABLE PAPER DECOR

(71) Applicant: American Greetings Corporation, Westlake, OH (US)

(72) Inventor: Charles Robert Kelly, Amherst, OH (US)

(73) Assignee: American Greetings Corporation, Cleveland, OH (US)

( * ) Notice: Subject to any disclaimer, the term of this patent is extended or adjusted under 35 U.S.C. 154(b) by 79 days.

(21) Appl. No.: 18/618,741

(22) Filed: Mar. 27, 2024

(65) Prior Publication Data

US 2024/0331578 A1 Oct. 3, 2024

Related U.S. Application Data

(60) Provisional application No. 63/455,175, filed on Mar. 28, 2023.

(51) Int. Cl.
*G09F 1/06* (2006.01)
*G09F 1/08* (2006.01)

(52) U.S. Cl.
CPC . *G09F 1/06* (2013.01); *G09F 1/08* (2013.01)

(58) Field of Classification Search
CPC .... G09F 1/06; G09F 1/08; A41G 1/04; A47G 33/00; B42D 15/00
See application file for complete search history.

(56) References Cited

U.S. PATENT DOCUMENTS

| | | | | | |
|---|---|---|---|---|---|
| 1,816,114 | A * | 7/1931 | Haegermann | A41G 1/04 | 428/10 |
| 1,920,551 | A * | 8/1933 | Carrie | A01G 5/04 | 47/41.12 |
| 2,076,945 | A * | 4/1937 | Hoeflich | B31D 5/04 | 493/464 |
| 2,244,516 | A * | 6/1941 | Davis | A41G 1/04 | 428/10 |
| 3,174,894 | A * | 3/1965 | Paige | B44F 9/00 | 428/116 |
| 3,520,759 | A | 7/1970 | Agena et al. | | |
| 4,379,797 | A * | 4/1983 | Cole | G09F 1/06 | 428/11 |
| 4,794,024 | A | 12/1988 | Crowell | | |
| 4,937,106 | A * | 6/1990 | Eliason | A41G 1/04 | 28/150 |
| 5,506,009 | A * | 4/1996 | Stolzman | A41G 1/00 | 428/7 |
| 9,807,944 | B2 * | 11/2017 | Kendall | A01G 5/04 | |
| 2009/0092773 | A1 | 4/2009 | Thomas | | |
| 2022/0157199 | A1 | 5/2022 | Hewitt | | |

FOREIGN PATENT DOCUMENTS

| | | |
|---|---|---|
| GB | 2601230 | 5/2022 |
| GB | 2622931 | 4/2024 |

* cited by examiner

*Primary Examiner* — Gary C Hoge
(74) *Attorney, Agent, or Firm* — Christine Flanagan

(57) ABSTRACT

Foldable, pop-up, paper décor items such as a wreath, a countdown calendar and a decorative scene that can be folded flat for mailing or storage and unfolded and placed on display. The foldable nature of these items promotes re-usability, minimizes storage space, and allows for easy shipping.

7 Claims, 17 Drawing Sheets

FOLDABLE PAPER DECOR

CROSS-REFERENCE TO RELATED APPLICATIONS

This application is a non-provisional of and claims priority to U.S. Provisional Patent Application No. 63/455,175, filed on Mar. 28, 2023, a copy of which is incorporated herein by reference in its entirety.

BACKGROUND OF THE INVENTION

This application is in the field of social expression products. More specifically, it is directed to foldable paper décor items which are reusable and easily stored when not in use.

SUMMARY OF THE INVENTION

A first embodiment of the present disclosure and related inventions is a foldable, pop-up wreath, containing a first substantially circular panel, a second substantially circular panel, a connector panel which attaches the first and second substantially circular panels, the first and second substantially circular panels having a plurality of slots contained thereon, wherein the plurality of slots contained on the first substantially circular panel are inserted into the plurality of slots contained on the second substantially circular panel to form a three dimensional wreath, and wherein the wreath can move between a first position, wherein it is in a flat, stacked arrangement, and a second position, wherein it is a three dimensional circular configuration.

A second embodiment of the present disclosure and related inventions is a foldable pop-up countdown calendar including a base panel, a right side panel, a left side panel, a plurality of mini pop-up elements, and a plurality of cutout flaps contained on the right and left side panels, wherein one of the plurality of mini pop-up elements is folded and concealed beneath each of the plurality of cutout flaps, and wherein lifting each of the plurality of flaps causes the mini pop-up element to move from a folded and concealed position to an unfolded, upright and visible position.

A third embodiment of the present disclosure and related inventions is a foldable pop-up decorative scene including a base folder having a first panel attached to a second panel along a first vertical fold line and the second panel attached to a third panel along a second vertical fold line, a first fold-out panel attached to the first panel of the base folder along a first horizontal fold line, a second fold-out panel attached to the second panel of the base folder along a second horizontal fold line, a third fold-out panel attached to the third panel of the base folder along a third horizontal fold line, and a plurality of decorative panels attached to the base folder and first, second, and third fold-out panels, wherein the plurality of decorative panels are in a parallel position with respect to the base folder, the plurality of decorative panels moveable between a first, stacked position and a second, upright position, wherein the base folder and the first, second, and third fold-out panels can be moved between an open and closed position, and wherein when the first, second, and third fold-out panels are moved to the open position, the decorative panels are revealed and unfolded.

DETAILED DESCRIPTION OF THE INVENTION

The present disclosure and related inventions are directed to foldable paper décor items. These décor items can be seasonal and embody decorative effects for a particular holiday, such as Valentine's Day, Mother's Day, Halloween, Christmas and Birthday, or event, such as a birthday, anniversary, or new baby. The décor items can be displayed during an appropriate season and then folded and stored during the off season and then re-used the following season. A consumer may decide to purchase a foldable paper décor item for them-selves or may choose to send or otherwise present it as a gift to a recipient. The foldable décor items may alternatively have a more everyday theme appropriate for all year-round.

The foldable décor items of the present disclosure and related inventions, as described herein, are made of paperboard or other such inexpensive, foldable, flexible, and sufficiently robust to withstand repeated use over the years. The items consist of a variety of interconnected panels which are manipulated into various folds to create 3D décor items. Examples are described herein with respect to a holiday wreath, a 3D countdown calendar, and foldable pop-up scene. These décor items, as described herein, can be moved from a substantially flat, folded, and storable position, to an upright, unfolded, three-dimensional (3D) display position.

Foldable Pop-Up Wreath

Figure 19:
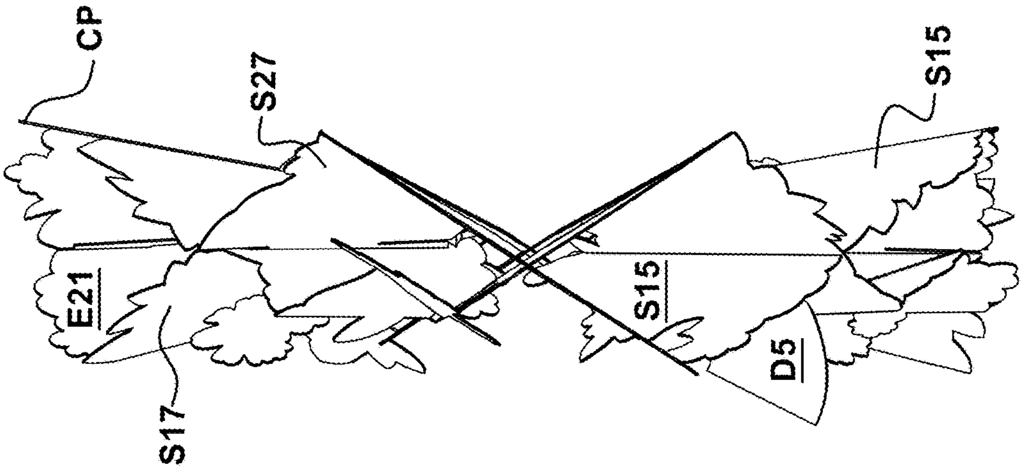
FIG. 19 is a right side view of the foldable pop-up wreath of FIG. 18.
Figure 18:
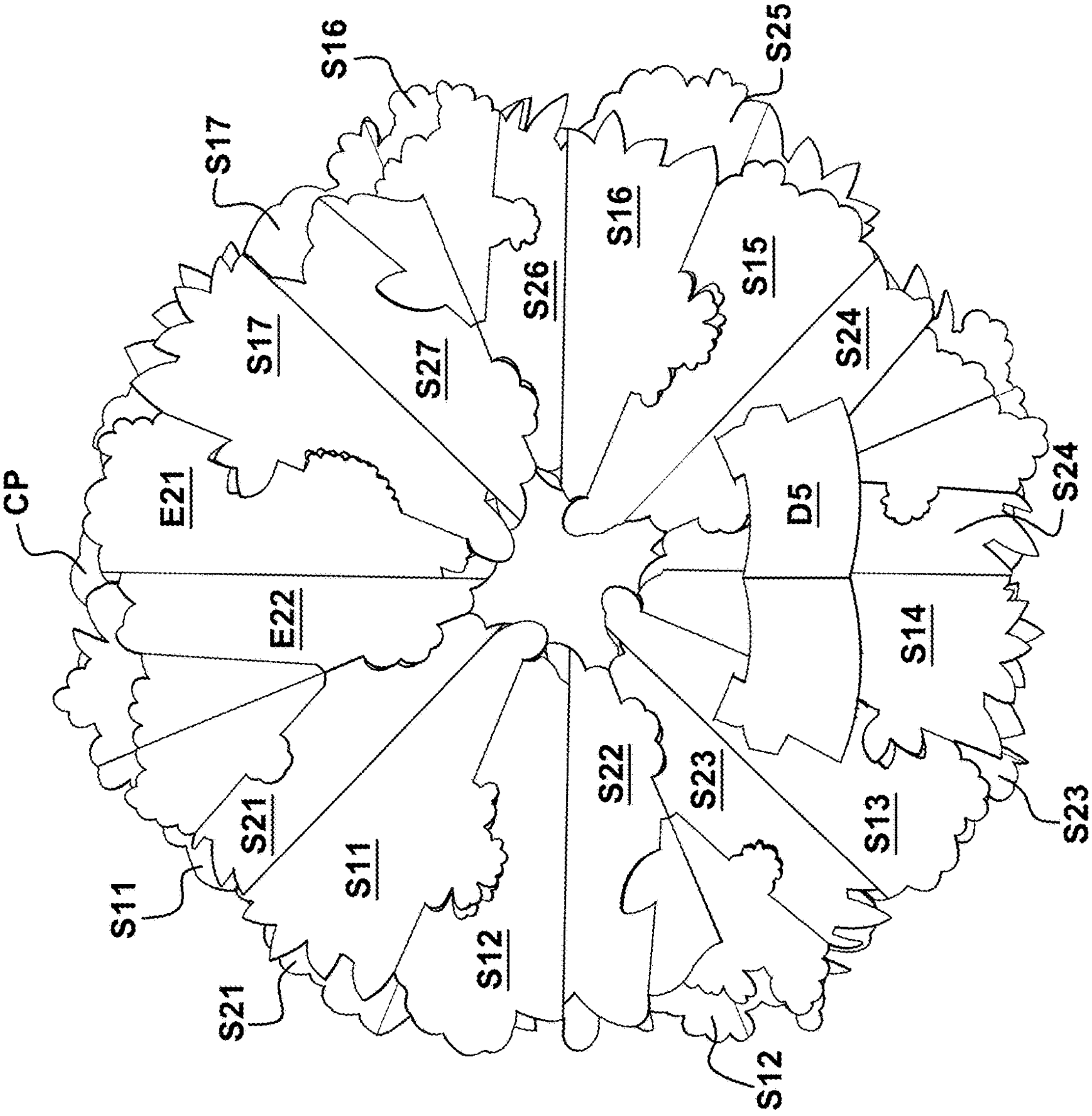
FIG. 18 is a front view of a foldable pop-up wreath of the present invention.
Figure 20:
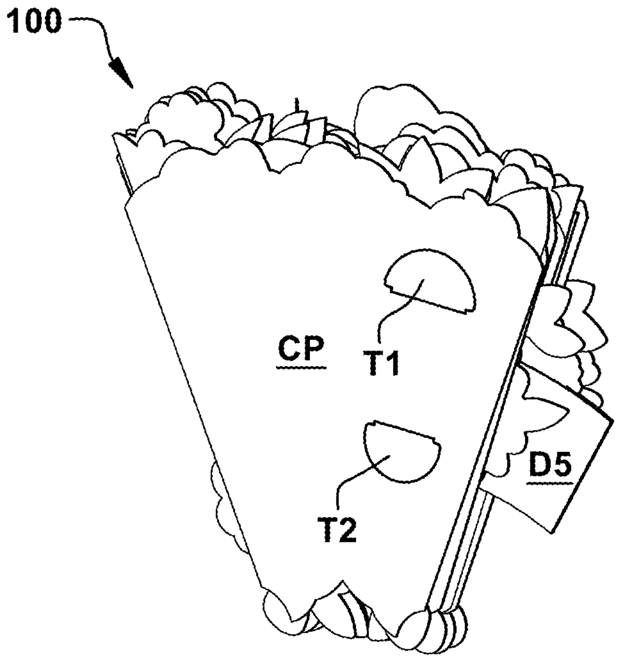
FIG. 20 is a perspective view of the foldable pop-up wreath of FIG. 18, in a closed or folded position.
Figure 21:
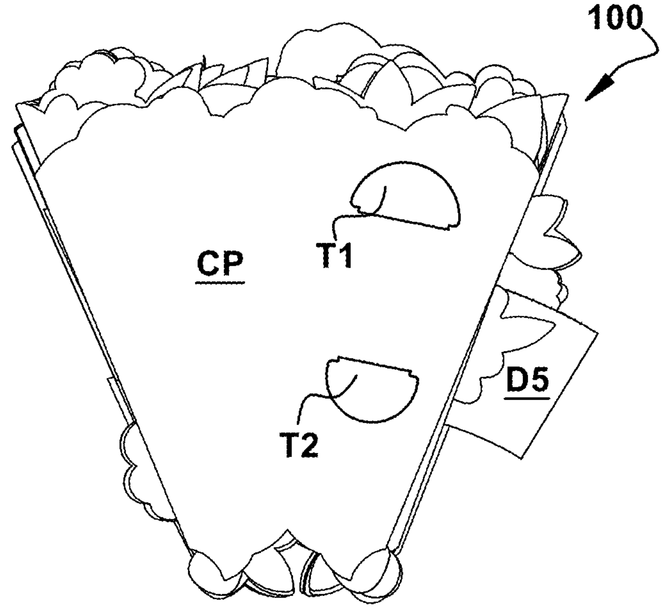
FIG. 21 is a front view of FIG. 20.

In a first embodiment, the foldable paper décor item is a foldable pop-up wreath 100, shown in FIGS. 18-24. The wreath 100 includes two main panels P1, P2, two end panels E11, E22, and one connector panel CP. Additional decorative items can be included as well. The foldable pop-up wreath 100 can move between a first position, wherein it is in a substantially flat, stacked arrangement, as shown in FIGS. 20-21, and a second position, wherein it is unfurled into a three-dimensional (3D) circular wreath, as shown in FIGS. 18-19.

Figure 22:
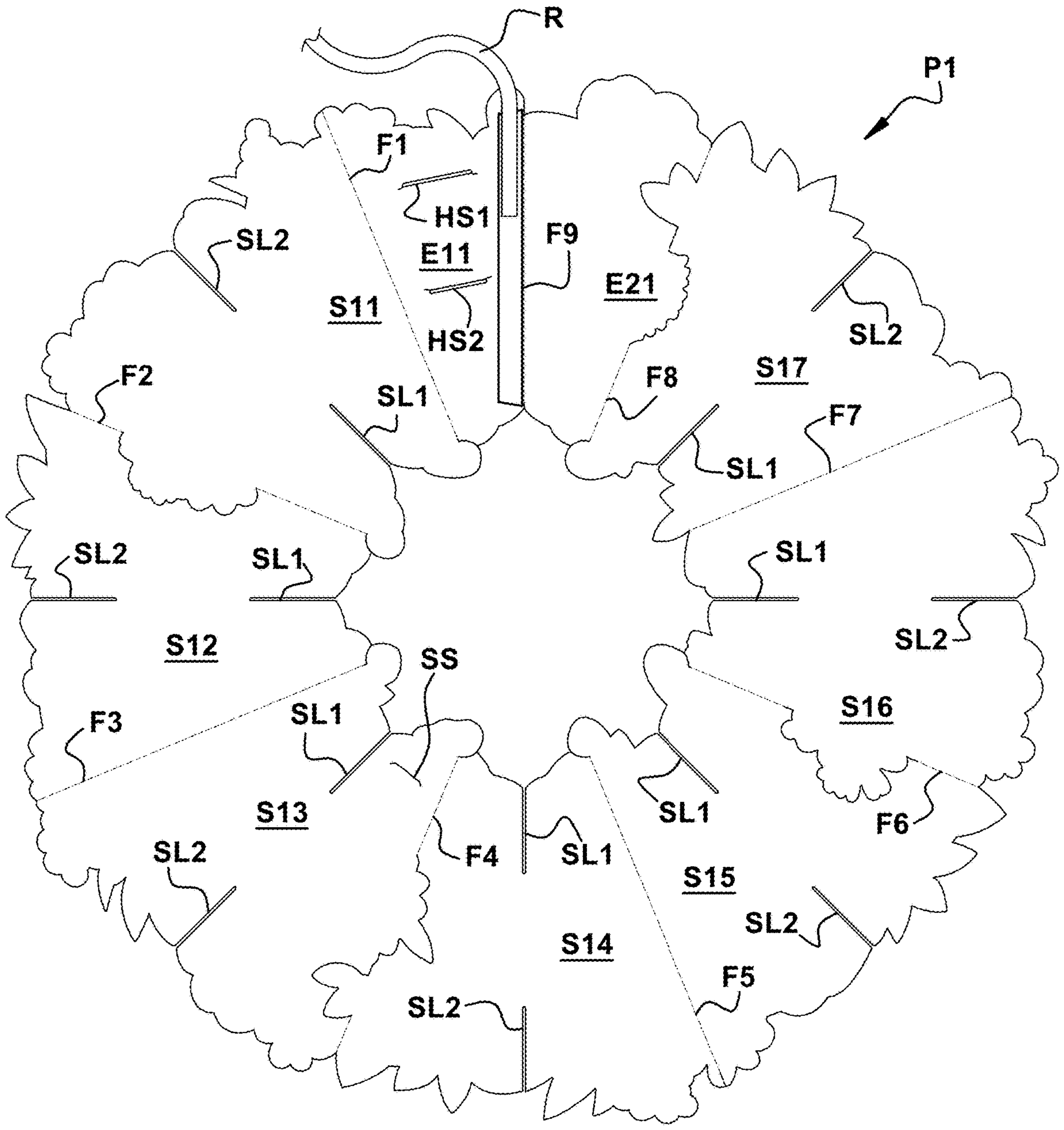
FIG. 22 is a front view of a first main panel of the foldable pop-up wreath of FIG. 18.

The first main panel P1, shown in FIG. 22, contains seven (7) sub-panels S11-S17, two end sub-panels E11, E21. The first sub panel S11 is attached to the first end panel E11 along a fold line F1 and to the second sub panel S12 along a fold line F2. The second sub-panel S12 is attached to the third sub-panel S13 along fold line F3. The third sub-panel S13 is attached to the fourth sub-panel S14 along fold line F4. The fourth sub-panel S14 is attached to the fifth sub-panel S15 along fold line F5. The fifth sub-panel S15 is attached to the sixth sub-panel S16 along fold line F6. The sixth sub-panel S16 is attached to the seventh sub-panel S17 along fold line F7. The seventh sub-panel S17 is attached to the second end panel E21 along fold line F8. Each of the seven sub-panels S11-S17 contain two slots thereon. A first slot SL1 extends inward from a bottom edge of each sub-panel and a second slot SL2 extends inward from a top edge of each sub-panel. The two slots SL1, SL2 are colinear and but do not meet, leaving solid space therebetween, as shown in the FIG. 22. The first end panel E11 contains two, spaced-apart, horizontally oriented slots thereon HS1, HS2.

Figure 23:
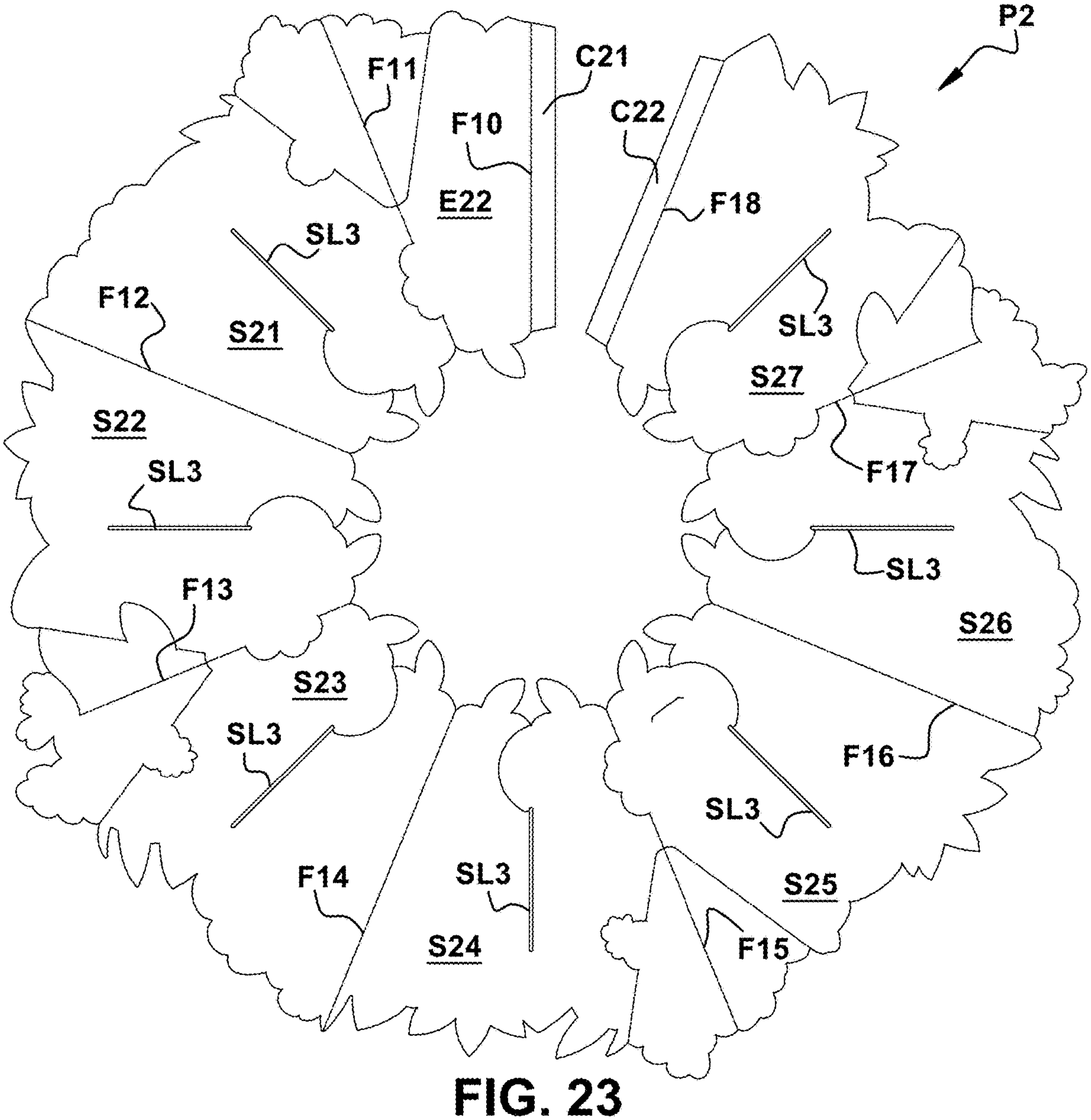
FIG. 23 is a front view of a second main panel of the foldable pop-up wreath of FIG. 18.
Figure 24:
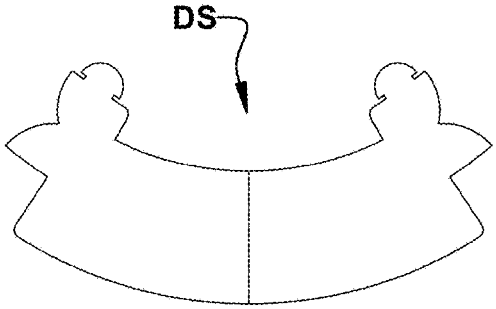
FIG. 24 is a decorative sign of the foldable pop-up wreath of FIG. 18.

The second main panel P2, shown in FIG. 23, contains seven sub-panels S21-S27, one end panel E22, and a two connector tabs CT21, CT22. The first connector tab CT21 is attached to the end panel E22 along fold line F10. The end panel E22 is attached to the first sub-panel S21 along fold line F11. The first sub-panel S21 is attached to the second sub-panel S22, along fold line F12. The second sub-panel S22 is attached to the third sub-panel S23 along fold line F13. The third sub-panel S23 is attached to the fourth sub-panel S24 along fold line F14. The fourth sub-panel S24 is attached to the fifth sub-panel S25 along fold line F15. The fifth sub-panel S26 is attached to the sixth sub-panel S26 along fold line F16. The sixth sub-panel S26 is attached to the seventh sub-panel S27 along fold line F17. The seventh sub-panel S27 is attached to the second connector tab CT22 along fold line F18. Each of the seven sub-panels S21-S27 on the second main panel P2 contain slots S3 which extend inward from a bottom edge thereof.

Prior to attaching the ends of the first and second main panels P1, P2 together, the sub-panels S21-S27 located on the second main panel P2 are affixed over the sub-panels S11-S17 on the first main panel P1 by inserting the slots SL3 on the second main panel P2 into the slots SL2 on the first main panel P1 such that each wreath sub-panel S11-S17 on first main panel P1 intersects with the wreath sub-panels S21-S21 on the second main panel P2, in accordion-style. Then the tabs T1, T2 contained on the connector panel CP are inserted into the slots HS1, HS2 contained on end panel E11 Each of the sub-panels S11-S17, S21-S27 are foldable along each fold line that connects the sub-panels to one another.

The connector panel CP is attached, via adhesive or other attachment mechanism, between the two (2) connector tabs C21, C22 on the second main panel P2, creating a fully circular shape. The connector panel CP contains two semi-circular tabs T1, T2 thereon (see FIGS. 20-21) which are inserted into the two horizontal slots HS1, HS2 contained on the end sub-panel E11 of the first main panel P1 to maintain the wreath in an open, 3D configuration. A glue tab is used to attach a portion of a ribbon R to one side of the wreath. The other end of the ribbon R is attached to the connector tab CT on the first main panel P1. The ribbon R is used to hang or suspend the unfurled, foldable pop-up wreath 100 from a hook or other hanger hardware. The decorative sign DS is optional and may be attached to the wreath 100 via the small slot SS on the third wreath sub-panel S13 on the first main panel P1.

The edges of each of the wreath sub-panels may be non-linear and cut in different shapes, such as, for example, a cluster of hearts or any other conceivable shape to convey the theme of the wreath (such as hearts for a Valentine's Day wreath). Other portions of the wreath sub-panels may be partially cut to create a pop-out, 3D visual effect.

Folding each panel upon the next allows the wreath to fold-up into a substantial flat position, for easy storage and shipping, if desired. Unfurling the panels creates a circular pop-up 3D wreath 100 which can be hung on a door or suspended from a hook or other hanger hardware.

Foldable Pop-Up Countdown Calendar

Figure 25:
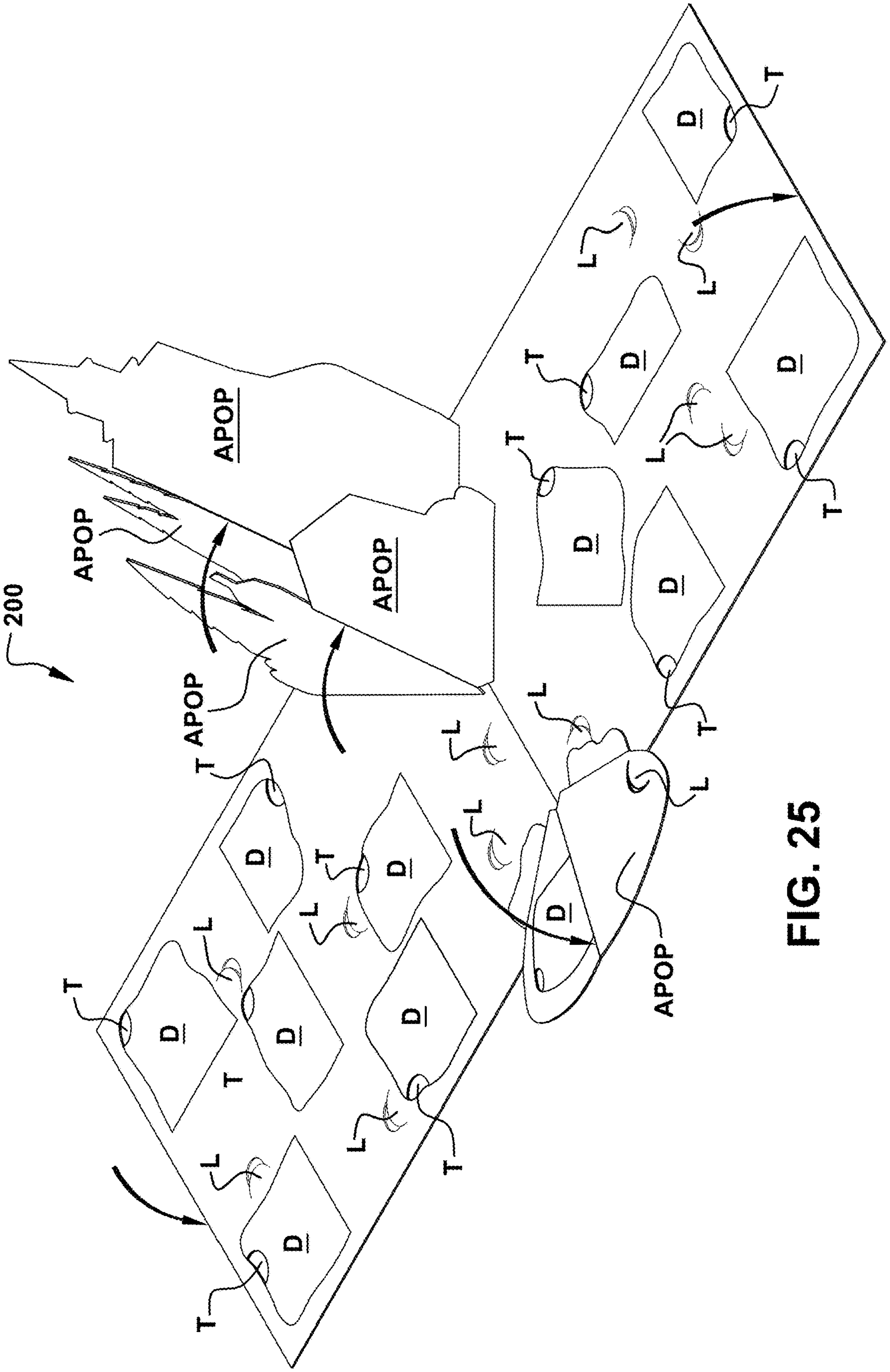
FIG. 25 is a perspective view of a foldable countdown calendar of the present invention.
Figure 26:
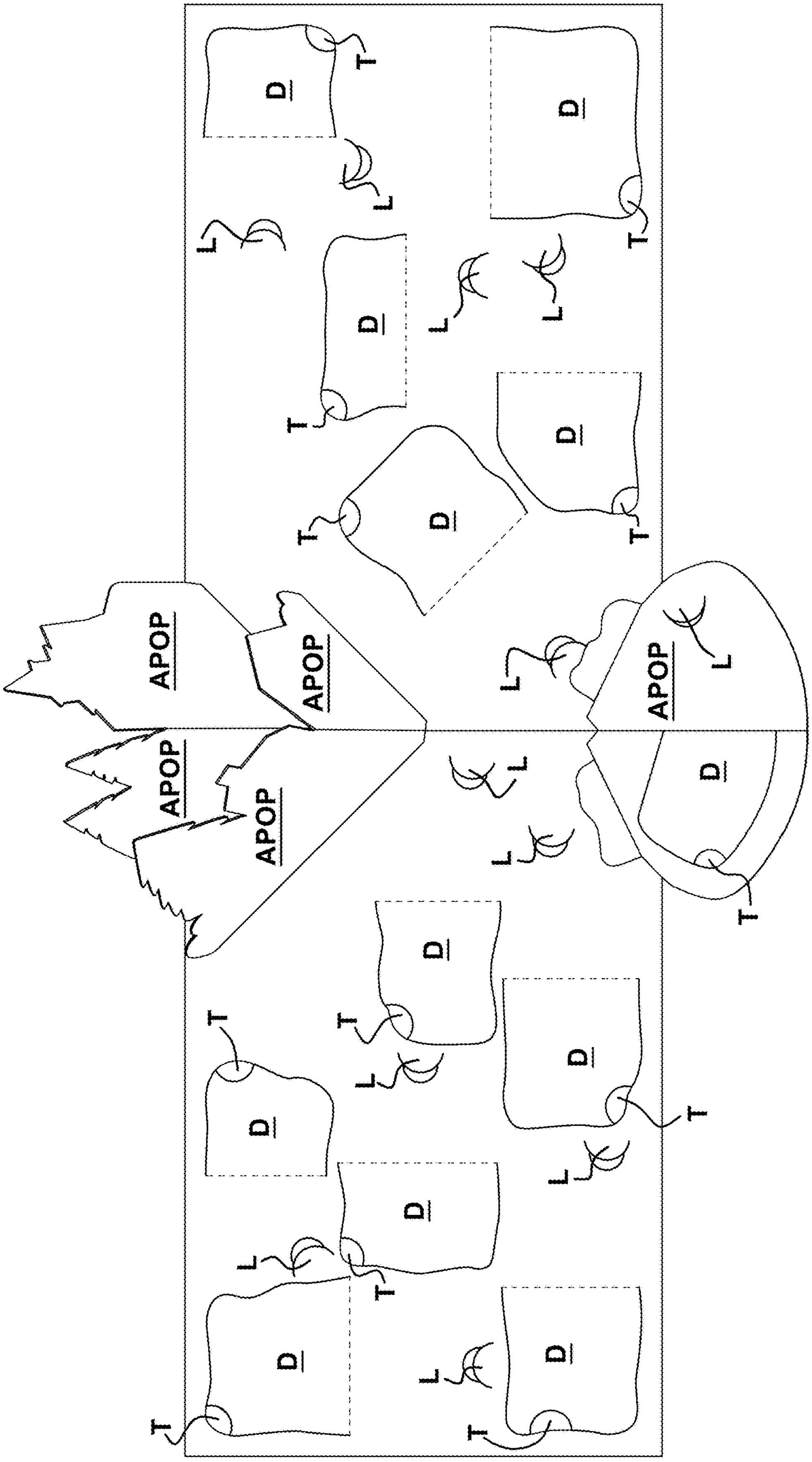
FIG. 26 is a front view of the foldable countdown calendar of FIG. 25.
Figure 27:
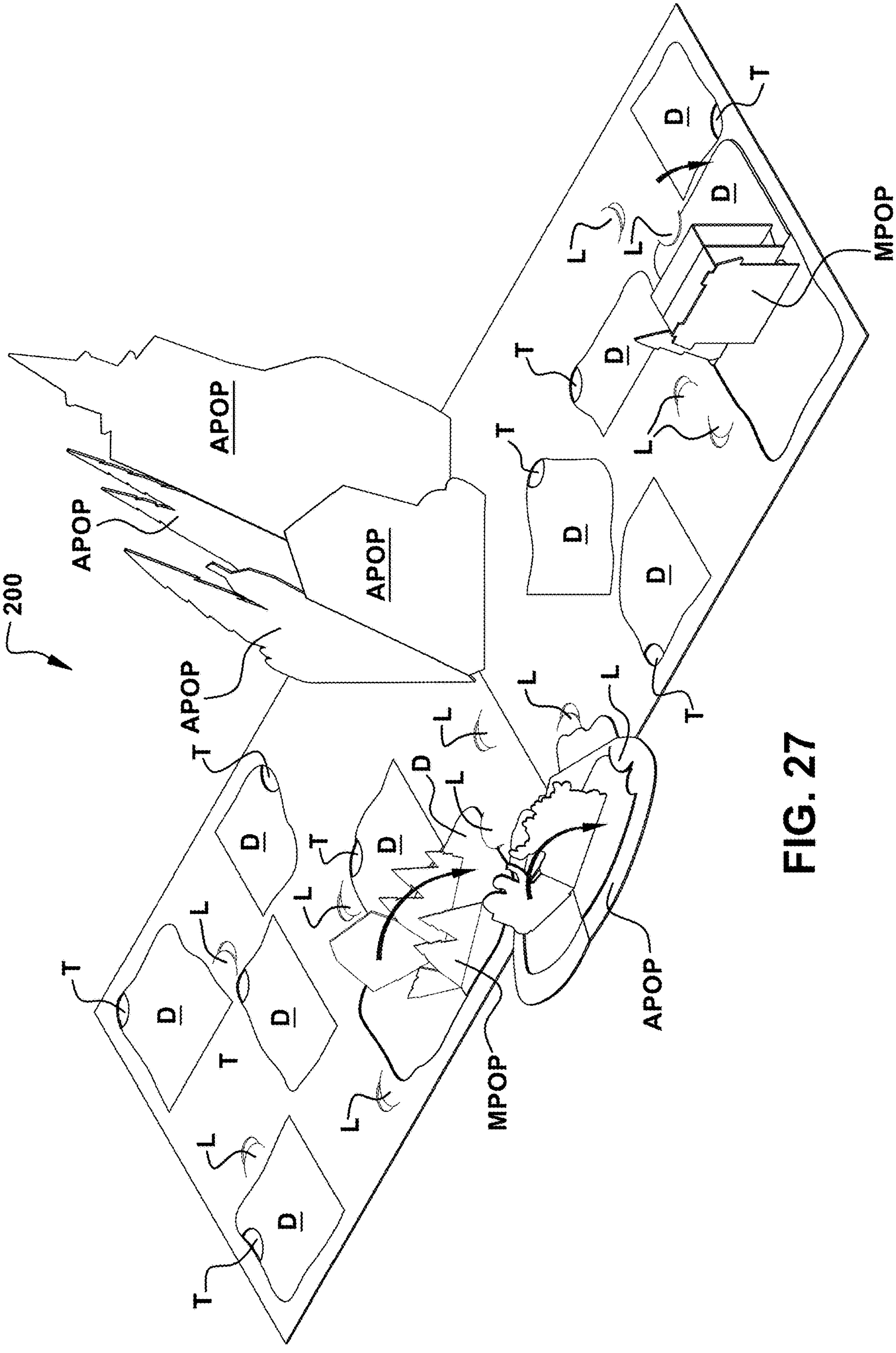
FIG. 27 is a perspective view of the foldable countdown calendar of FIG. 25, with two open doors.
Figure 28:
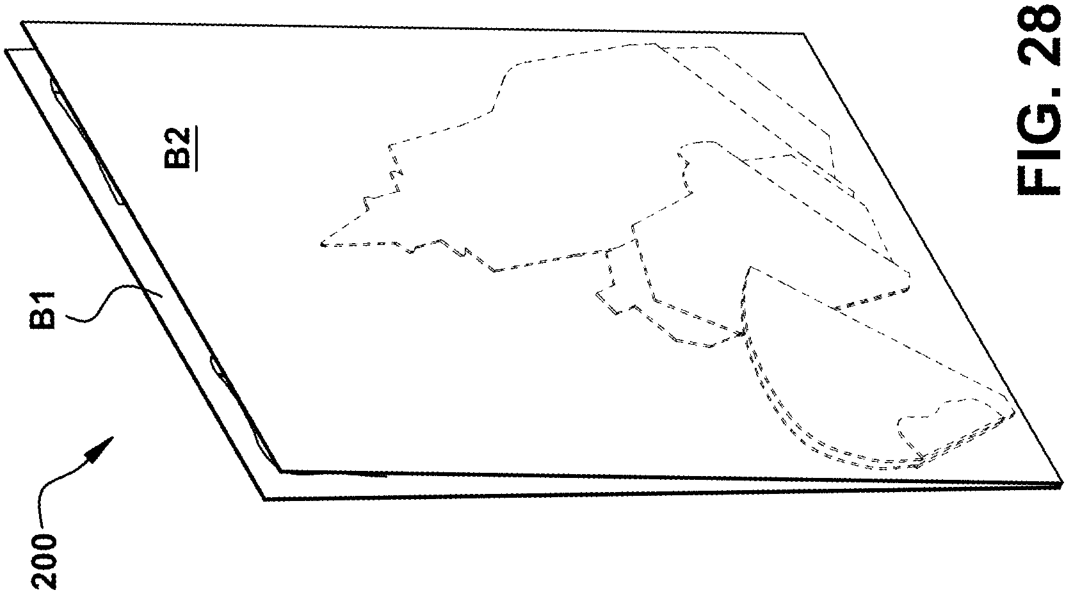
FIG. 28 is a perspective view of the foldable countdown calendar of FIG. 25, in a fully closed position.
Figure 29:
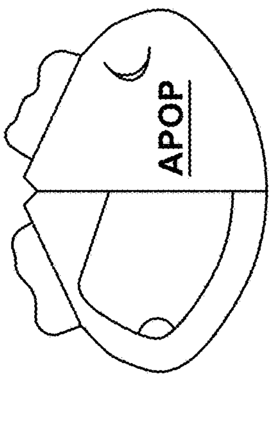
FIGS. 29-35 are various, individual components of the foldable countdown calendar of FIG. 25.
Figure 30:
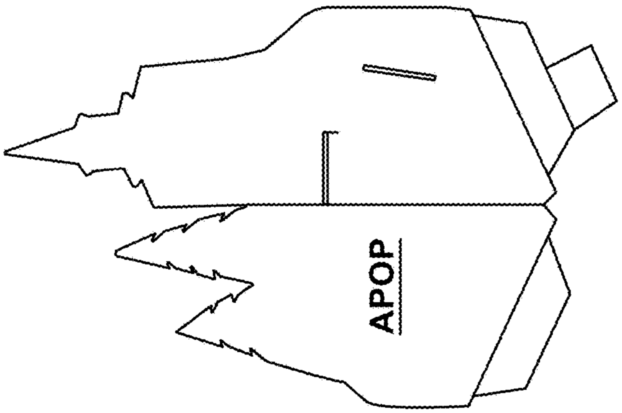
Figure 31:
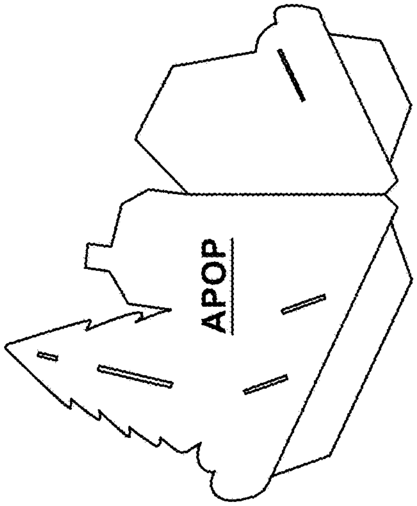
Figure 32:
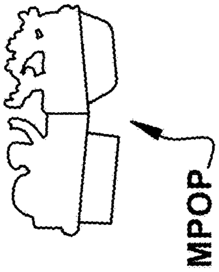
Figure 33:
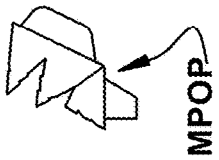
Figure 34:
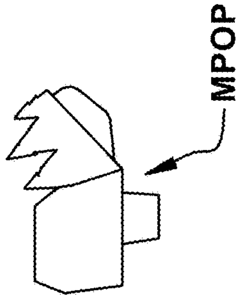
Figure 35:
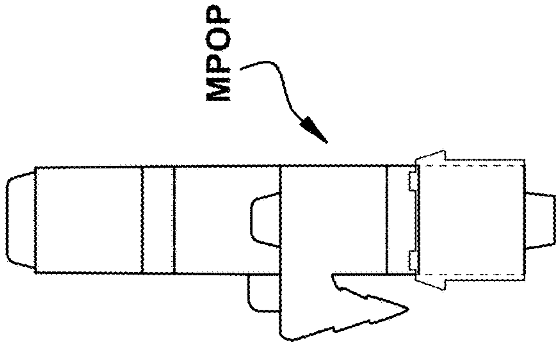
Figure 36:
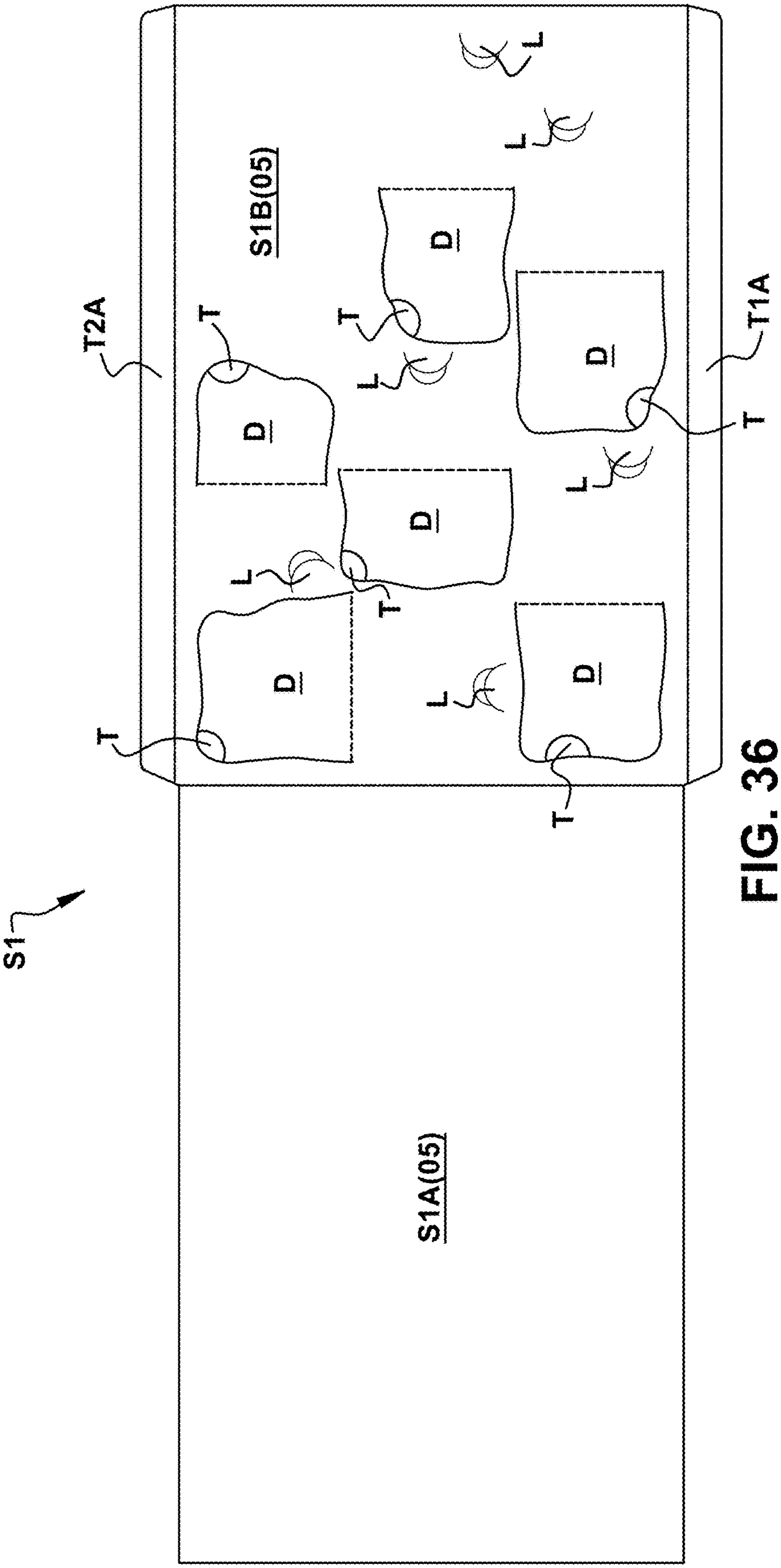
FIG. 36 is a front view of a right side panel of the foldable countdown calendar of FIG. 25.
Figure 37:
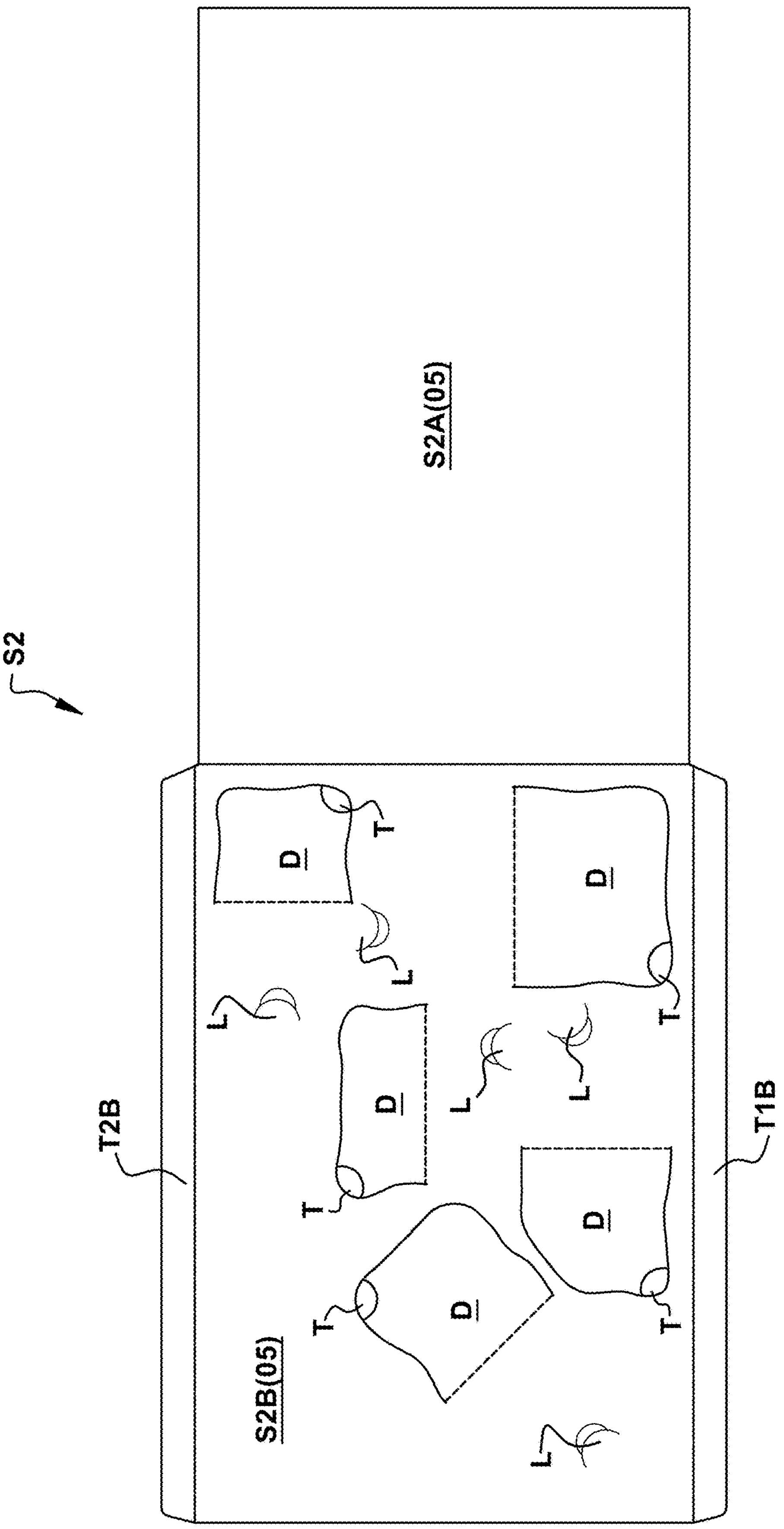
FIG. 37 is a front view of a left side panel of the foldable countdown calendar of FIG. 25.

In a second embodiment, the foldable paper décor item is a foldable pop-up countdown calendar 200, shown in FIGS. 25-37. The calendar 200 can move between a first position, wherein it is in a substantially flat, closed, stacked arrangement, as shown in FIG. 28, and a second position, wherein it is in an open, unfolded, display position, as shown in FIG. 25. In the first, or flat position, the calendar can be inserted into an envelope for storage or for gifting to a recipient.

The calendar includes a base panel B, a right side panel S1, a left side panel S2, and various pop-up elements. The base panel B includes a first base panel B1 attached along fold line F1 to a spine panel SP. The spine panel SP is attached to a second base panel B2 along fold line F2. The base panel B serves as the base for the countdown calendar 200 when it is in an open, unfolded, display position, and as a cover when it is in the closed or folded position.

First and second side panels are attached to the base panel B. The right side panel S1, shown in FIG. 36, contains a first sub-panel S1A attached to a second sub-panel S1B along fold line F3. Both side panels S1, S2 contain an outer surface OS and an inner surface IS opposite the outer surface OS. The left side panel S2, shown in FIG. 37, contains a first sub-panel S2A attached to a second sub-panel S2B along fold line F4. The second sub-panels S1B, S2B of the right S1 and left S2 side panels, each contain a first elongate tab T1A, T1B attached to a first long side thereof along fold lines F5, F7 respectively and a second elongate tab T2A, T2B attached to a second long side thereof along fold lines F6, F8 respectively. Both second sub-panels S1B, S2B also contain various semi-cutout shapes ("doors") D thereon. Each door D contains one side edge fold line that remains attached to and a part of the second-sub-panels S1B, S2B and the remainder of the door edge is attached along a perforation. Each door D also contains a thumbnail or moon-shaped cutout T along one free edge thereof. Both second sub-panels S1B, S2B also contain various thumbnail or moon-shaped cutouts L thereon. The inside surface IS of the first sub panel S1A, S2A of the right and left side panels S1, S2 contains printing thereon, such as a written, word, phrase, or sentiment, drawing, picture, etc. The first sub panels S1A, S2A are folded in a downward fashion, along fold lines F3 and F4, respectively, to lie beneath the second sub-panels S2A, S2B (such that the inner surface IS of the first sub panels S1A, S2A is facing the inner surface IS of the second sub-panels S1B, S2B). The printing on the inside surface IS of the first sub-panels S1A, S2A are positioned beneath the door cutouts D on the second sub-panels S2A, S2B, such that when said doors D are "opened" by placing one's thumb or finger into the thumbnail or moon-shaped cutout T along a free edge of each door D and folding said door D back along line connecting the door D to one of the sub-panels S2A, S2B. The first and second elongate tabs T1A, T2A, T1B, T2B are then folded beneath the stacked first S1A, S2A and second S1B, S2B sub-panels and attached thereto. The right side panel S1 is then attached to the first base panel B1 (such that the outer surface OS of the first sub-panel S1A is facing the inside surface IS of the first base panel B1), via adhesive or other attachment mechanism. The left side panel S2 is then attached to the second base panel B2 (such that the outer surface OS of the second sub-panel S2A is facing the inside surface IS of the second base panel B2), via adhesive or other attachment mechanism.

A mini pop-up item MPOP (see FIGS. 32-35) is attached between the inner surface IS of the first sub-panels S1A, S2A and each door D. Each mini pop-up MPOP item is foldable such that they can move between a first position, wherein they are folded in a substantially flat, stacked arrangement (FIG. 25), and a second position, wherein they are unfolded into an upright 3D configuration (FIG. 27). The mini pop-up MPOP items can be of any shape or size (if they fit in the space between a door D). They can be themed to match the theme of the calendar such as, for example, a Christmas countdown calendar may contain mini pop-up elements that are Christmas-related, such as a Christmas tree, a Christmas cottage, Santa's sleigh, a toy store, etc. As another example, a Halloween countdown calendar may contain Halloween-related mini pop-ups, such as a haunted house, a pumpkin, a ghost, or a spooky tree.

In addition to the mini pop-up items MPOP found beneath each door D, additional ancillary pop-up elements APOP (see FIGS. 29-31) may be directly attached to the right and left side panels S1, S2. These ancillary pop-up elements APOP may also follow a theme such as, for example, a Christmas village or a haunted graveyard. These ancillary pop-up items are also moveable between a first position, wherein they are in a substantially flat, stacked arrangement (between the base panels B1, B2—See FIG. 28) and a second position, wherein they are unfolded into an upright 3D configuration (See FIGS. 25-27).

The second sub-panels S1B, S2B contain various thumbnail or moon-shaped cutouts L thereon. Each door D will correspond to one strategically placed thumbnail cutout L into which a portion of the door D will be inserted to retain the door D in the open position, as shown in FIG. 27.

In operation, the countdown calendar 200 is opened by pivoting the first base panel B1 away from the second base panel B2 about the spine panel SP. Upon opening, the ancillary pop-up items APOP are move from the first (folded) position to the second (unfolded) position, creating a scene along with the printed inside surface of the countdown calendar (second sub-panels S1B, S2B) (See FIG. 25). Each door D will contain a number printed thereon. In one embodiment, as shown in the figures, the countdown calendar 200 contains twelve (12) doors D, each with a number between 1 and twelve (12). In other embodiments, fewer doors or additional doors may be present. The user will open the first door by grasping a portion of the door D (via the thumbnail cutout T) and folding it back about the fold line connecting the door to the calendar, thereby removing the other edges of the door D along the perforation. As each door D is opened, the mini pop-up element MPOP beneath said door D will move between the first (folded) position and the second (unfolded) position reveling another part of the overall scene. Each opened door D can be retained in the open position by inserting a portion of said door D into a nearby moon-shaped cutout CO. Once all the doors D are opened, the full scene of the countdown calendar 200 is revealed.

Foldable Pop-Up Scene

In a third embodiment of the present disclosure and related inventions, the foldable pop-up décor item is a foldable pop-up scene 300, as shown in FIGS. 1-17. The foldable pop-up scene 300 consists of a main folder MF and several individual pop-up elements that make up the foldable pop-up scene 300. The main folder M represents the background scenery and includes three (3) main panels M1, M2, M3 with attached fold-out panels. A first main panel M1 is attached, along fold line F1, to a first tab panel T1. The first tab panel T1 is attached, along fold line F2, to a second main panel M2. The second main attached, along fold line F4, to a third main fold panel M3. The first main panel M1 is attached, along a bottom edge thereof, to a first fold-out panel FP1 along fold line F5. The second main panel M2 is attached, along a bottom edge thereof, to a second fold-out panel FP2 along fold line F6. The third main panel M3 is attached, along a bottom edge thereof, to a third fold-out panel FP3. The three (3) main panels M1, M2, M3 and corresponding fold-out panels FP1, FP2, FP3 contain various adhesive strips for attachment to various display panels arranged at different depth locations to create a 3D visual effect. The foldable pop-up scene 300 that is described herein and shown in the figures takes the form of a Christmas nativity scene, however, other embodiments may have different themes or designs, such as, for example, a Christmas village, a city street, a garden, or any other conceivable theme.

Figure 1:
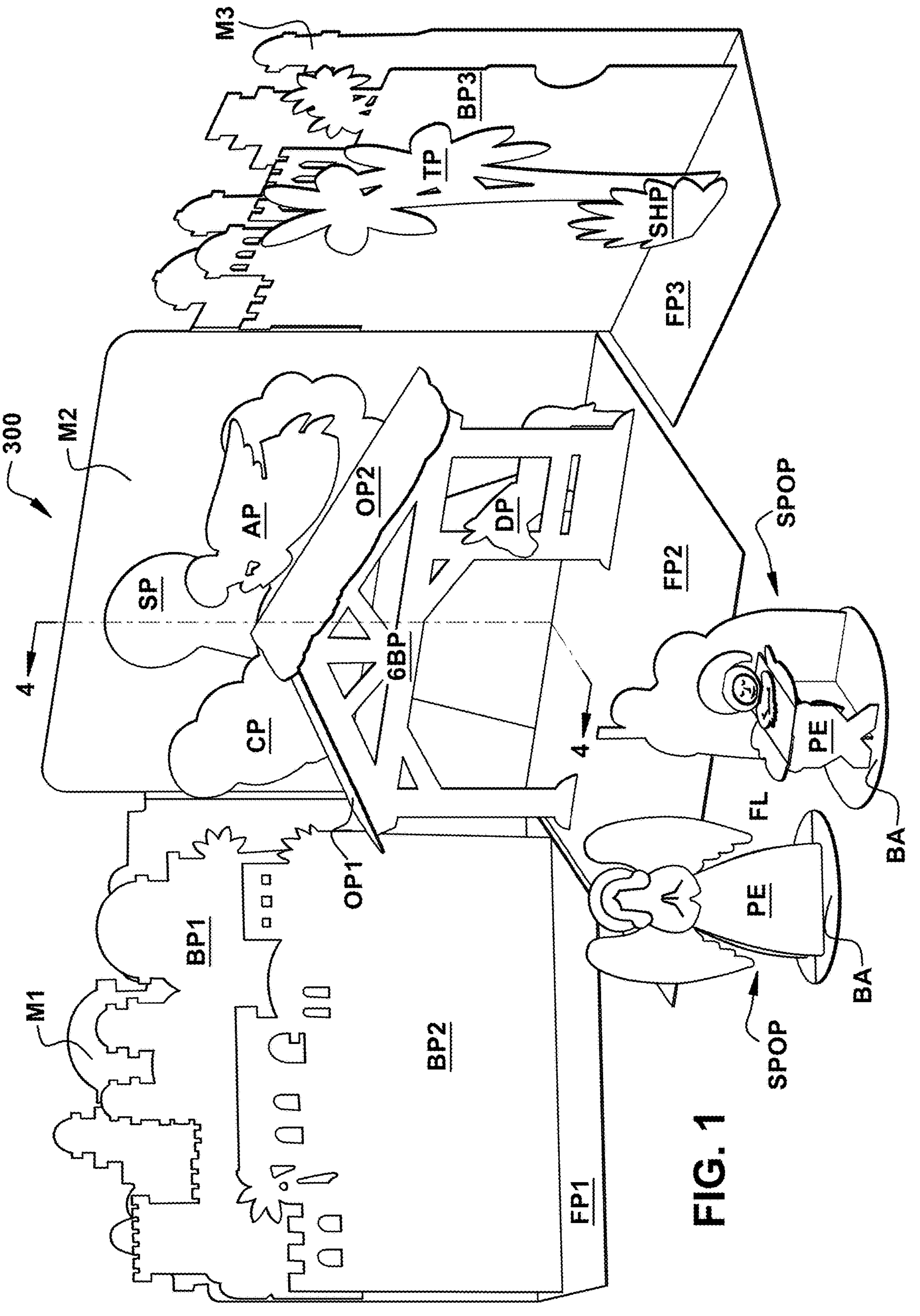
FIG. 1 is a perspective view of a foldable pop-up scene of the present invention.

Also attached to the main folder MF are a plurality of pop-up panels that are arranged to provide a background and create a depth effect to the overall scene, as shown in FIG. 1. The pop-up panels may be of different sizes and shapes and may have different edge outlines and configurations. They may also contain decorative effects, including but not limited to intricate designs with various cutouts, decorative printing, material finishings (foil, glitter, etc.) and other such effects. The pop-up panels may spell out words or phrases or may be designed with a specific overall theme, such as, as the example disclosed herein and shown in the figures, a Christmas nativity scene. The foldable pop-up scene 300 contains a plurality of pop-up panels that are placed at various distances with respect to the main panel M and are generally in a parallel position with respect to one another and to the main folder panels M1, M2, M3. In the embodiment described herein and shown in the figures, the pop-up panels include 3 building façade panels, a stable, trees and various other auxiliary panels. The pop-up panels may be attached to the main folder MF via various tabs, struts, or other such attachment mechanisms. They may also be attached to the fold out panels FP1, FP2, FP3.

Figures 5, 6, 7, 8, 9, 10, 11, 12:
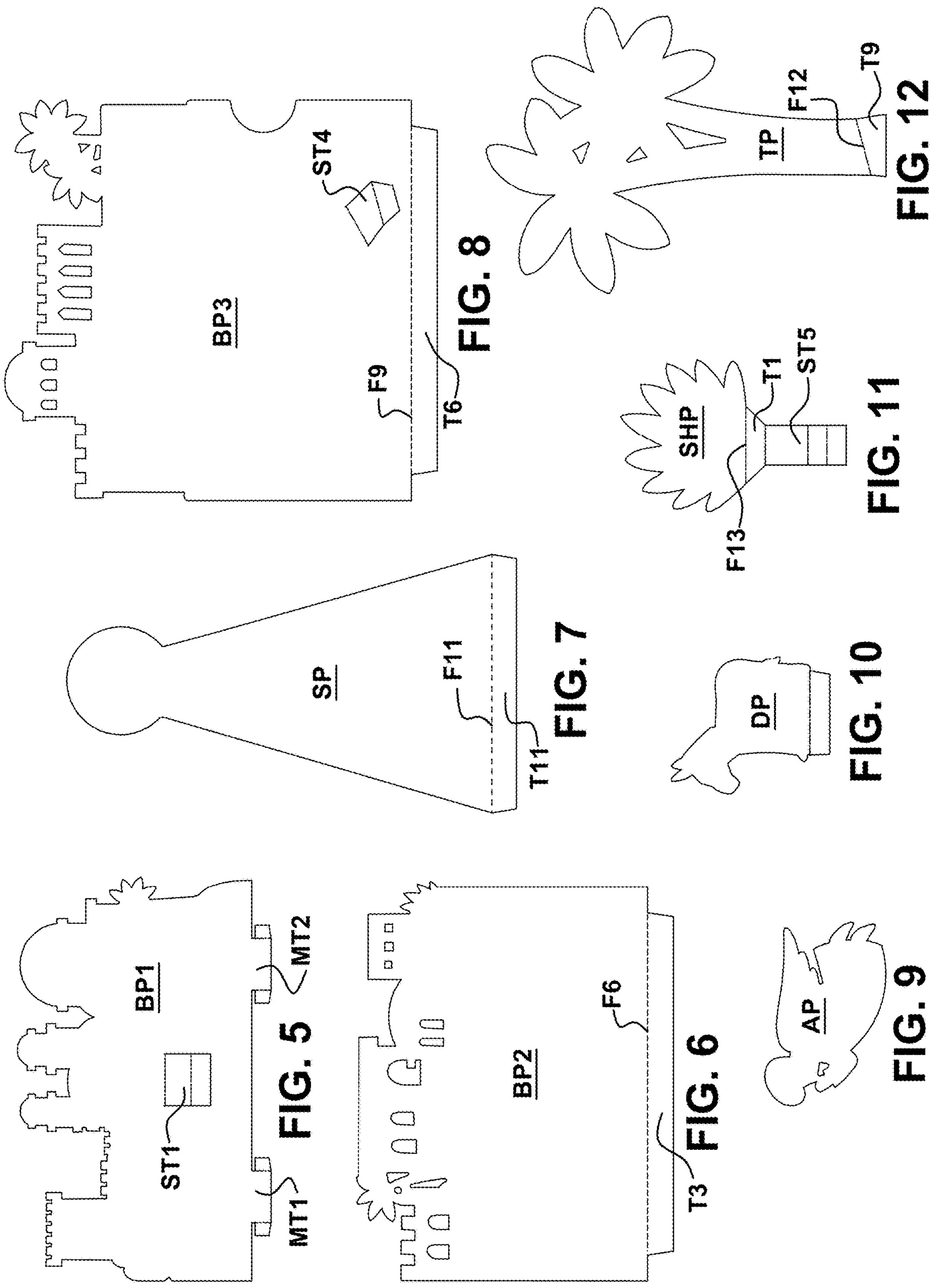
FIGS. 5-16 are various, individual components of the foldable pop-up scene of FIG. 1.

A first building fagade panel BP1, shown in FIG. 5, contains two integral mini tabs MT1, MT2 along a lower edge thereof. The first building fagade panel BP1 is attached to the first main panel M1, via a first strut ST1, which is contiguous, at one end, to the first building fagade panel BP1. A second building fagade panel BP2, shown in FIG. 6, is attached to an elongate tab panel T3 along fold line F6. The second building fagade panel BP2 is attached to the first main panel M1 via a second strut ST2. The second struct ST2 contains an elongate tab panel T4 attached to an upper edge thereof, along fold line F7 and an elongate tab panel T5 attached to a lower edge thereof, along fold line F8. The second strut ST2 also contains two slots SL, SL2 therein into which the two mini tab panels MT1, MT2, of the first building fagade panel BP1 are inserted, thereby connecting the first building fagade panel BP1 to the second strut ST2. The elongate tab portion T3 of the second building fagade panel BP2 is folded along fold line F6 such that it is perpendicular to the second building fagade panel BP2 and attached to the first fold out panel FP1. The first building fagade panel BP1 is attached to the first main panel M1 such that, from a front view thereof, a portion of the first main panel can be seen behind the first building fagade panel BP1. The second building fagade panel BP2 is attached to the first main panel M1 such that, from a front view thereof, a portion of the first building fagade panel BP1 and the first main panel M1 can be seen behind the second building fagade panel BP2.

A third building fagade panel BP3, shown in FIG. 8, is attached to an elongate tab panel T6 along fold line F9. The third building fagade panel BP3 is attached to the third main panel M3, via a strut ST3. The strut ST3 contains an elongate tab panel T7 attached to an upper edge thereof, along fold line F10 and an elongate tab panel T8 attached to a lower edge thereof, along fold line F11. The elongate tab portion T6 of the third building fagade panel BP3 is folded along fold line F9 such that it is perpendicular to the third building fagade panel BP3 and attached to the third fold out panel FP3. The elongate tab portion T7 of strut ST3 is folded along fold line F10 and attached to the third main panel MP3 and the elongate tab portion T8 of strut ST3 is folded along fold line F11 and attached to the rear surface of the third building fagade panel BP3, thereby attaching the third building fagade panel BP3 to the third main panel MP3. The third building fagade panel BP3 is attached to the third main panel M3 such that, front a front view thereof, a portion of the third main panel M3 can be seen behind the third building fagade panel BP3. A faux tree panel TP, as shown in FIG. 12, contains a tab T9 attached thereto along fold line F12 at a bottom edge thereof. The faux tree panel TP is attached to the third building fagade panel BP3 via strut ST4, which is contiguous at one end with the third building fagade panel BP3. The tab T9 is folded along fold line 12 such that it is perpendicular to the faux tree panel TP and attached to the third fold out panel FP3. A faux shrub panel SHP, shown in FIG. 11, contains a tab T10 attached thereto along fold line F13 at a bottom edge thereof. The faux shrub panel SHP is attached to the faux tree panel TP, via strut ST5, which is contiguous at one end with the faux shrub panel SHP. The tab T10 is folded along fold line F13 such that it is perpendicular to the faux shrub panel SHP and attached to the third fold out panel FP3.

Figure 16:
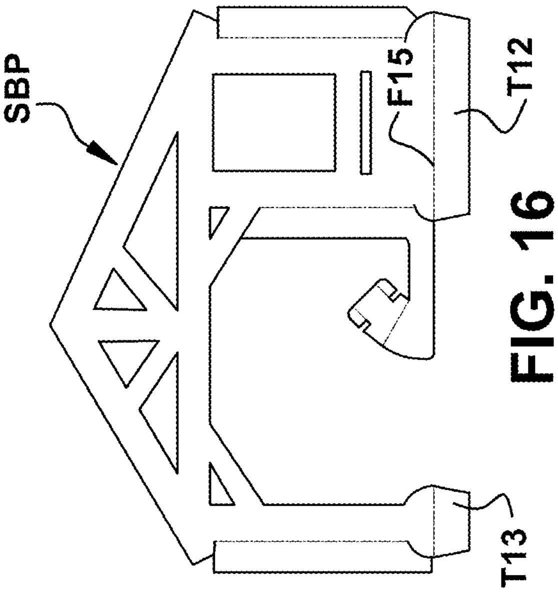
Figure 14:
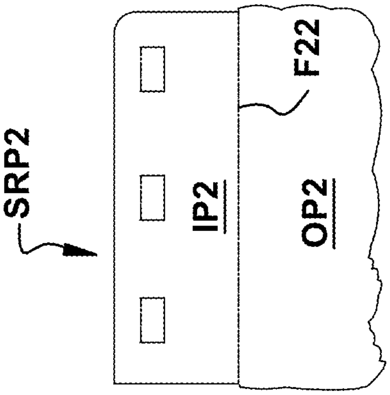
Figure 13:
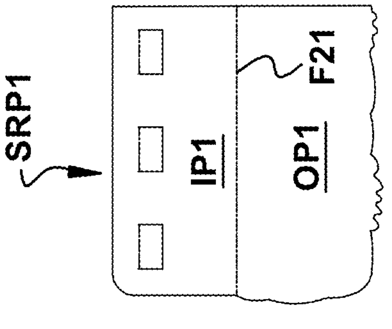
Figure 15:
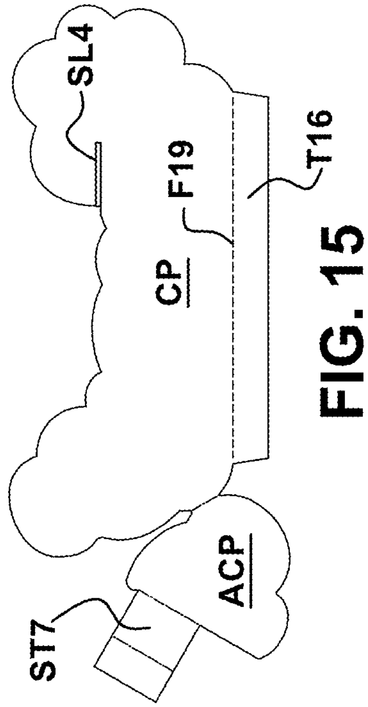
Figure 17:
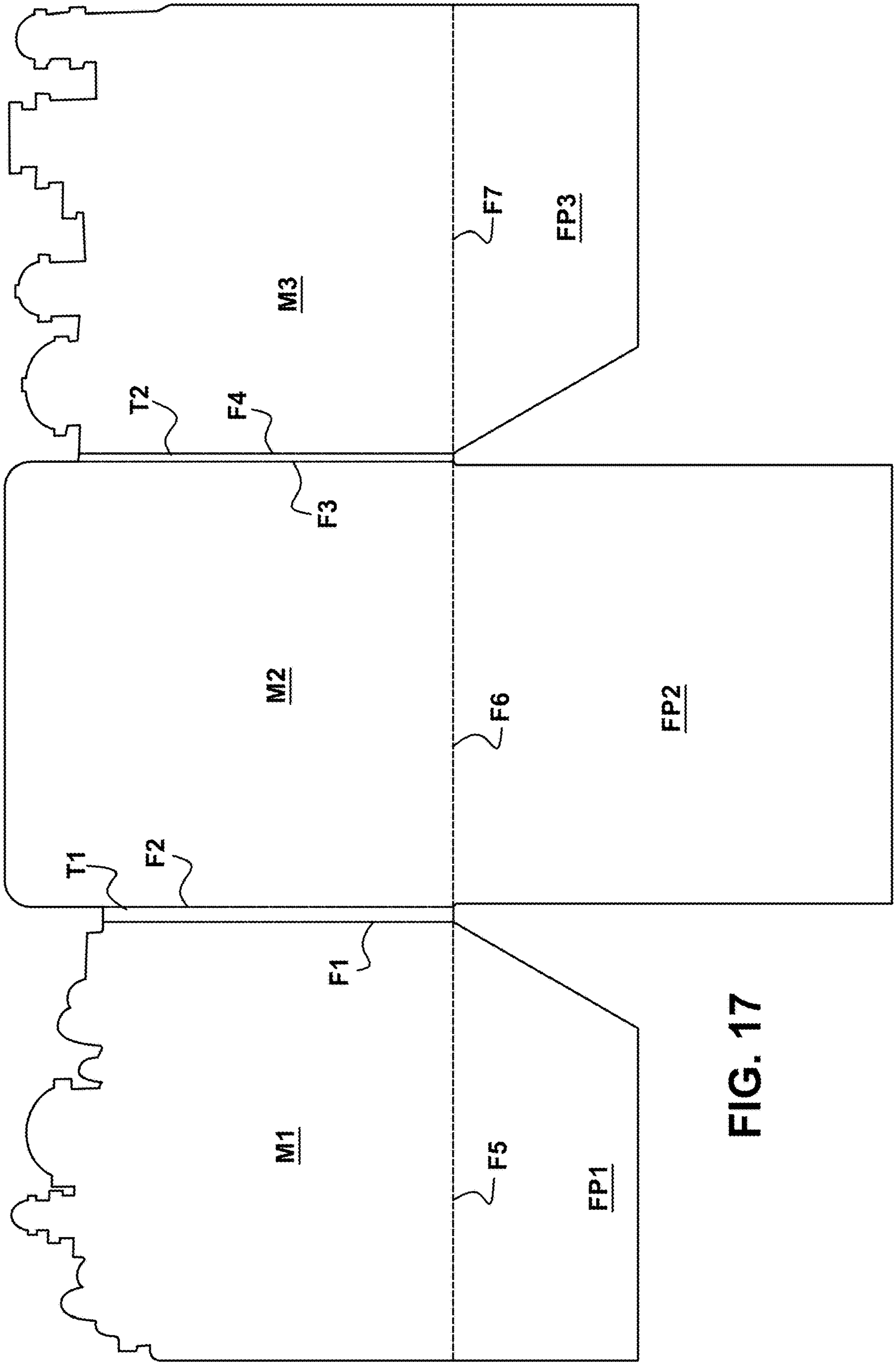
FIG. 17 is a front view of the main folder of the foldable pop-up scene of FIG. 1.

A faux star panel SP, shown in FIG. 7, contains and elongate tab T11 attached along fold line F14 at a bottom edge thereof. The tab T11 is folded upward along fold line F14, such that it is substantially parallel with the faux star panel SP and attached to the second main panel M2. A faux stable panel SBP, as shown in FIG. 16, contains tabs T12, T13 along a lower edge thereof. Tab T12 is attached to the faux stable panel SBP along fold line F15 and tab T13 is attached to the faux stable panel SBP along fold line F16. The faux stable panel SPB also contains various openings or cutouts thereon. The faux stable panel SPB is attached to the second main panel SP2 via strut ST6 (see FIG. 4). Strut ST6, contains an elongate tab panel T14 attached to an upper edge thereof, along fold line F17, and an elongate tab panel T15 attached to a lower edge thereof, along fold line F18. Strut ST6 also contains an elongate slot thereon SL3. Elongate tab T14 is folded along fold line F17 and attached to the second main panel MP2. Elongate tab T15 is folded along fold line F18 and attached to a rear surface of the faux stable panel SBP. The faux star panel SP is inserted into the elongate slot SL3 on strut ST6. The forward-leaning positioning of the faux star panel SP, attached to a lower level of the second main panel MP2 (at the proximate intersection between the second main panel MP2 and the second fold out panel FP2) and then inserted into the slot SL3 on ST6 which is positioned away from the second main panel MP2, gives the visual effect of the faux star panel emerging from the faux cloud panel CP (described below). A faux cloud panel CP, shown in FIG. 15, contains an elongate tab T16 attached to a lower edge thereof along fold line F19 and an auxiliary cloud panel ACP attached thereto along fold line F20. The auxiliary cloud panel ACP is also attached to a strut ST7. Tab T16 is folded along fold line F19 and attached to strut ST6, proximate the elongate slot SL3. The auxiliary cloud panel ACP is folded along fold line F20 and attached to the rear surface of the faux cloud panel CP and strut ST7 is attached to the second main panel MP2. Two stable roof panels SRP1, SRP2, as shown in FIGS. 13-14, each contain an outer portion OP1, OP2 and an inner portion IP1, IP2 attached along fold lines F21 and F22 respectively. Each of the two stable roof panels SRP1, SRP2 also contain three contiguous tab panels T17-T19, T20-T22 attached thereto. The first stable roof panel SRP1 is folded along fold line F21, such that the inner portion IP lies below the outer portion OP. The tabs T17-T19 are attached to an inner surface of the faux stable panel SBP along a right downward sloping portion thereof. The second stable roof panel SRP2 is folded along fold line F22, such that the inner portion IP lies below the outer portion OP. The tabs T20-22 are attached to an inner surface of the faux stable panel SBP along a left downward sloping portion thereof, as shown in the Figures. A small portion of the second stable roof panel SPR2 (which is slightly longer than the first stable roof panel SRP1) overlaps the first stable roof panel SRP1. A faux angel panel AP is attached to the faux cloud panel CP via a first strut and to the second main panel MP2 via a second strut (not shown). The faux angel panel AP is positioned about the faux stable panel SBP and proximate the faux cloud panel CP and the faux star panel SP. A faux donkey panel contains a tab T23 attached along a lower edge thereof, along fold line F23. Tab T23 is folded along fold line F23 such that it is perpendicular to the faux donkey panel DP and attached to the second fold out panel FP2 proximate one of the openings or cutouts in the faux stable panel SBP.

Figure 2:
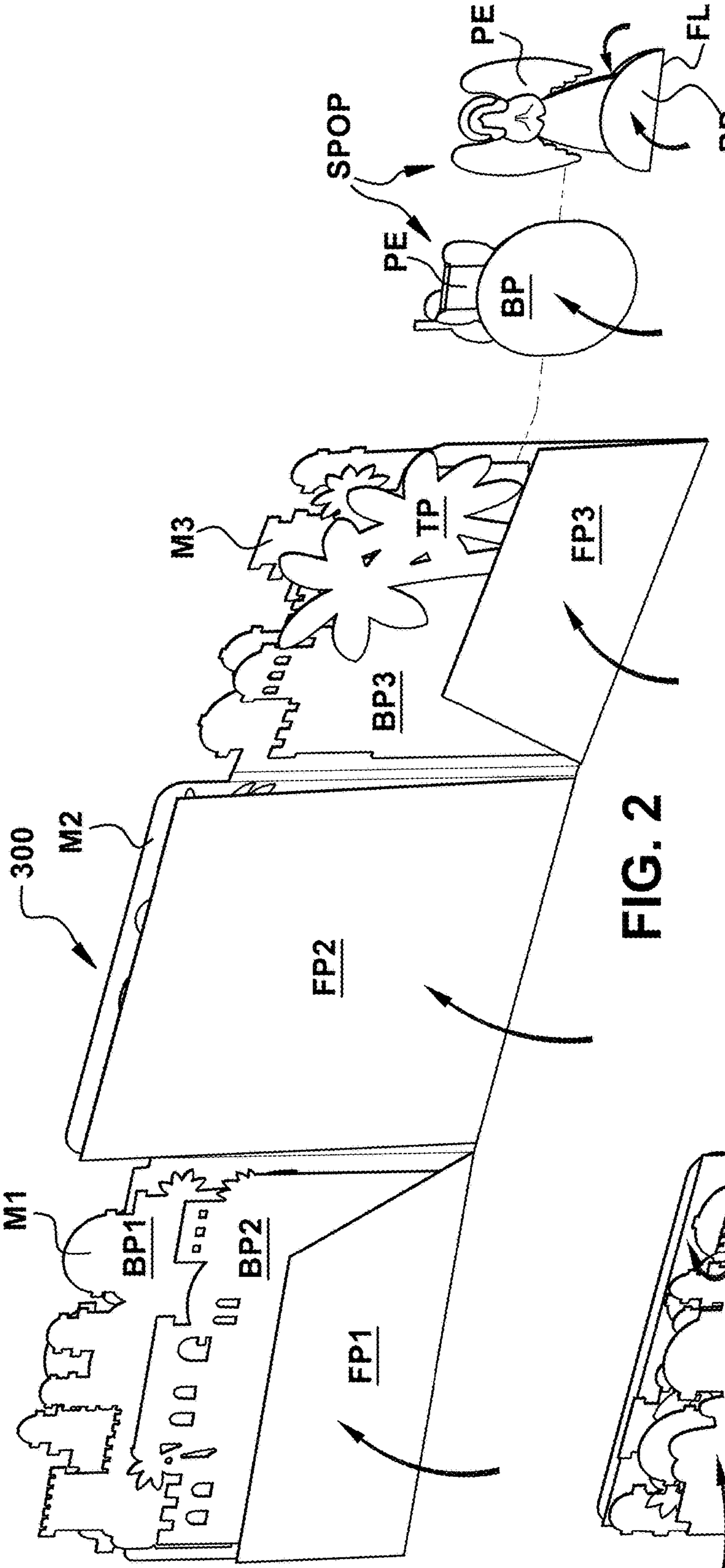
FIG. 2 is a perspective view of the foldable pop-up scene of FIG. 1 in a semi-closed position.
Figure 3:
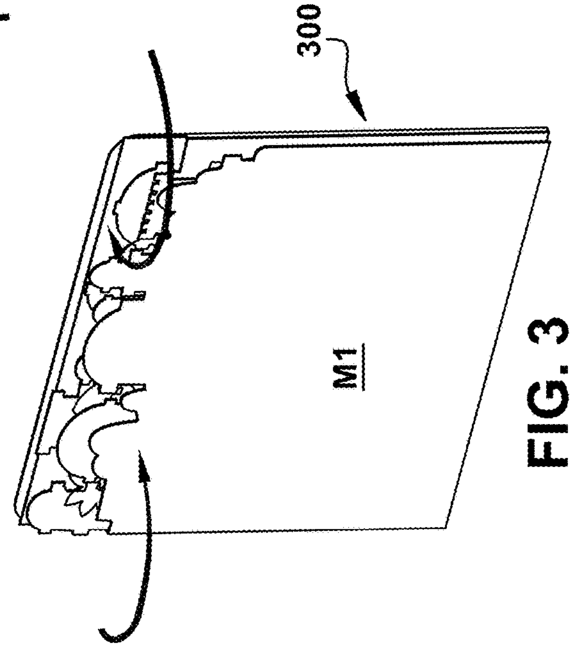
FIG. 3 is a perspective view of the foldable pop-up scene of FIG. 1, in a fully closed position.
Figure 4:
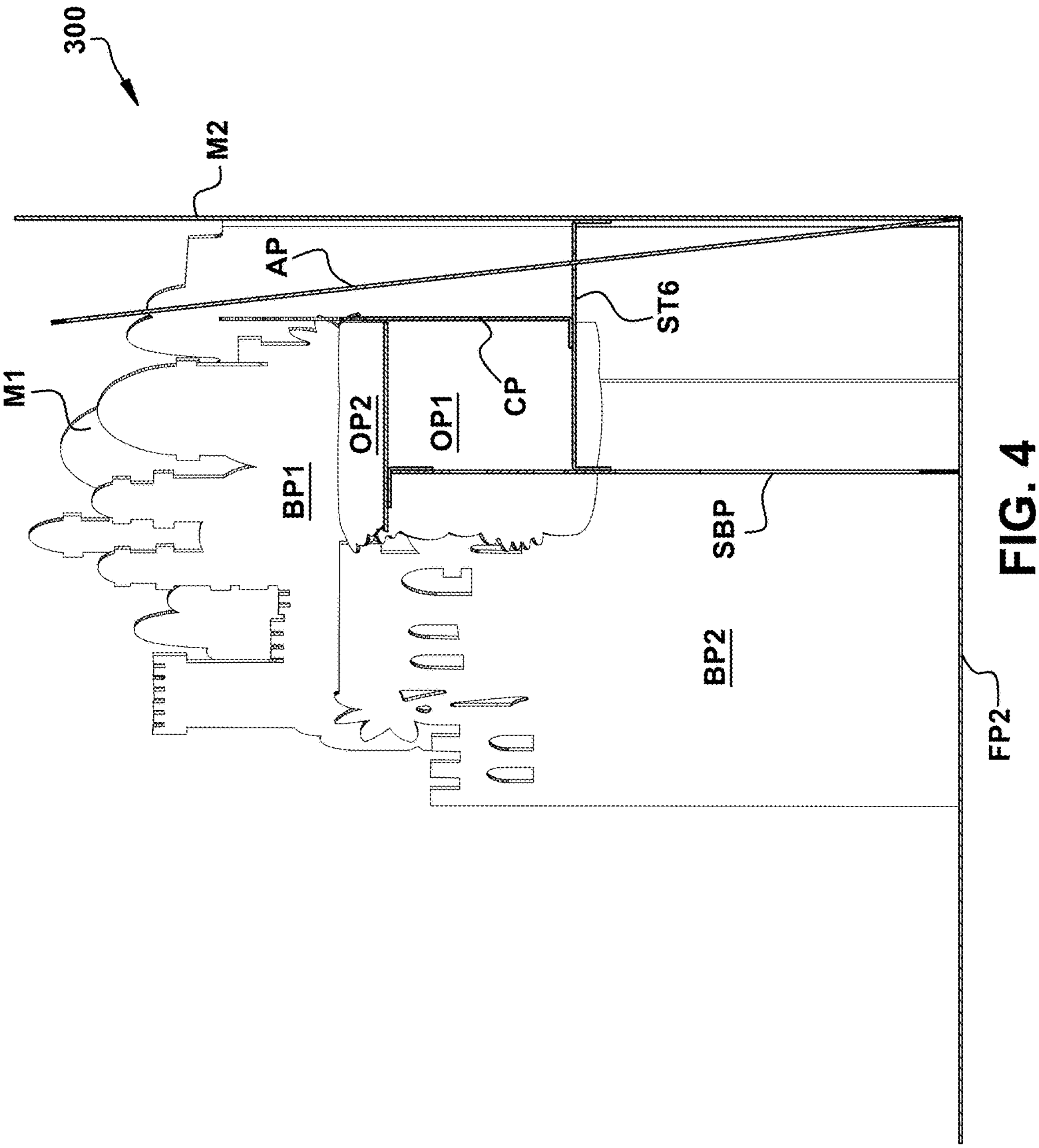
FIG. 4 is a right side view of the foldable pop-up scene of FIG. 1, from the perspective of arrows 4-4.

The strategic positioning of the various panels that make up the foldable pop-up scene 300 and the attachment of these various panels to the main folder M and fold out panels F1, F2, F3 allow the foldable pop-up scene 300 to move between a first, substantially flat, stacked position, as shown in FIG. 3, and a second, open and upright position with a pop-up and 3D effect, as shown in FIG. 1. In operation, it takes two steps for the foldable pop-up scene 300 to fully move between the first and second positions. When it is in the first position, it is in a completely folded and stacked arrangement (first main panel MP1 overlying the third main panel MP3 and the third main panel MP3 overlying the second main panel MP2)(See FIG. 3) and may be inserted into an envelope for gifting or storage. To move the foldable pop-up scene 300 into the second position, a user must first open the first main panel MP1 by pivoting it about fold line F1/F2 to reveal the third main panel MP3. The third main panel MP3 must be opened by pivoting it about fold line F3/F4 to reveal the second main panel MP2 (see FIG. 2). Next, the user must move the main folder from a flat or horizontal position to a vertical position which will cause the fold out panels FP1, FP2, FP2 to unfold about fold lines F5, F6, F7 and be positioned perpendicular to the upright, vertically positioned main panels M1, M2, M3 (see FIG. 1).

Various individual supplementary pop-up structures SPOP are included to fill out or supplement the foldable pop-up scene 300, as shown in FIGS. 1-2. Each supplementary pop-up structure SPOP include a base panel BA and pop-up element PE attached thereto. The pop-up elements PE may include one or more mini-pop up layers and mini struts to attach and give balance to the entire pop-up structure SPOP. Each base panel BA contains a fold line FL thereon, creating two base sub-panels. When the base panel BA is folded upward along the fold line FL, the pop-up elements PE are moved to a flat position between the two base sub-panels. They can easily be stored in an envelope in this position. Unfolding each base panel BA along the fold line FL causes the pop-up elements PE to pop-up into an upright position. Each of the pop-up structures SPOP can stand upright on its own and are intended to be unfolded and placed around the main folder M and fold out panels FP to complete the scene. Examples of individual pop-up structures for the nativity scene include but are not limited to: Mary and Joseph; baby Jesus in a manger; an angel; 3 wisemen; a camel; and sheep and other farm animals. The entire scene can be folded up by first folding the supplementary pop-up structures SPOP and placing them into an envelope. The envelope can be stored behind one of the panels of the main folder M. The main folder M can be disassembled by folding each of the fold-out panels FP1, FP2, FP3 upward along the fold lines F5, F6, F7 to face the main folder panels MP1, MP2, MP3 (see FIG. 2). The third main panel can first be folded over the top of the second (or middle) main panel MP2 and then the first main panel MP1 can then be folded over the top of the second and third panels MP2, MP3. The main folder M can then be placed into a larger envelope for storage or for shipping, if desired.

The invention claimed is:

1. A foldable wreath comprising:
- a first substantially circular panel;
- a second substantially circular panel;
- a connector panel which attaches the first and second substantially circular panels;
- the first and second substantially circular panels having a plurality of slots contained thereon;
- wherein the plurality of slots contained on the first substantially circular panel are inserted into the plurality of slots contained on the second substantially circular panel to form a three dimensional wreath; and
- wherein the wreath can move between a first position, wherein it is in a flat, stacked arrangement, and a second position, wherein it is a three dimensional circular configuration.

2. The foldable wreath of claim 1, wherein the first and second substantially circular panel are intertwined in an accordion style.

3. The foldable wreath of claim 1, wherein each of the first and second substantially circular panels comprise several subpanels attached along a plurality of fold lines and at least one end panel.

4. The foldable wreath of claim 3, wherein each of the subpanels contained on the first substantially circular panel contain two slots thereon.

5. The foldable wreath of claim 3, wherein each of the subpanels contained on the second substantially circular panel contain one slot thereon.

6. The foldable wreath of claim 3 further comprising a connector panel is removably attached to the end panel.

7. The foldable wreath of claim 1, wherein the connector panel contains two tabs thereon.

* * * * *